United States Patent [19]
Gale, Jr. et al.

[11] Patent Number: 5,387,924
[45] Date of Patent: * Feb. 7, 1995

[54] METHOD OF MITIGATING THE EFFECTS OF A DEFECTIVE ELECTROMECHANICAL PIXEL

[75] Inventors: Richard O. Gale, Jr., Richardson; Brian C. McCormack, Denton, both of Tex.

[73] Assignee: Texas Instruments Incorporated

[*] Notice: The portion of the term of this patent subsequent to Feb. 22, 2011 has been disclaimed.

[21] Appl. No.: 148,753

[22] Filed: Nov. 5, 1993

Related U.S. Application Data

[63] Continuation of Ser. No. 965,835, Oct. 23, 1992, Pat. No. 5,289,172.

[51] Int. Cl.$^6$ .............................................. G09G 3/34
[52] U.S. Cl. ..................................... 345/108; 359/291
[58] Field of Search .................. 345/84, 85, 108, 109, 345/904; 359/297, 291

[56] References Cited

U.S. PATENT DOCUMENTS

| | | | |
|---|---|---|---|
| 5,096,279 | 3/1992 | Hornbeck et al. | 359/230 |
| 5,289,172 | 2/1994 | Gale et al. | 345/108 |

FOREIGN PATENT DOCUMENTS

| | | | |
|---|---|---|---|
| 2-301722 | 12/1990 | Japan | 345/904 |
| 19-15843 | 10/1991 | WIPO | 345/904 |

*Primary Examiner*—Edward K. Look
*Assistant Examiner*—F. Daniel Lopez
*Attorney, Agent, or Firm*—Brian C. McCormack; James C. Kesterson; Richard L. Donaldson

[57] ABSTRACT

Methods are disclosed by which the effects of a defective electromechanical pixel (20) having a beam (30) and a hinge (34,36) are mitigated. These methods may damage the hinge (34,36) or the beam (30) and comprise the step of applying a voltage sufficient to damage the hinge (34,36) or beam (30) of said electromechanical pixel (20) by mechanical overstress, thermal overstress, electrochemical reaction, or thermally induced chemical reaction. Other methods are also disclosed.

15 Claims, 7 Drawing Sheets

METHOD OF MITIGATING THE EFFECTS OF A DEFECTIVE ELECTROMECHANICAL PIXEL

CROSS-REFERENCE TO RELATED PATENTS

This is a continuation of application Ser. No. 07/965,835, filed Oct. 23, 1992, now U.S. Pat. No. 5,289,172.

The following coassigned patent applications are hereby incorporated herein by reference:

| Pat No. | Filing Date | TI Case No. |
| --- | --- | --- |
| 5,096,279 | Nov. 26, 1990 | TI-14481A |
| 5,083,857 | Jun. 29, 1990 | TI-14568 |

FIELD OF THE INVENTION

This invention relates to digital micro-mirror devices (DMD's), also known as deformable mirror devices, and more particularly to a method of mitigating the effects of defective pixels in such devices.

BACKGROUND OF THE INVENTION

DMD's have found numerous applications in the areas of optical information processing, projection displays, and electrostatic printing. See references cited in L. Hornbeck, 128×128 Deformable Mirror Device, 30 IEEE Tran. Elec. Dev. 539 (1983).

A great number of the applications described in Hornbeck, supra, use DMD's operated in a bistable mode as described in U.S. Pat. No. 5,096,279, incorporated by reference herein. The details of '279 will be summarized in some detail herein, but briefly in the bistable mode of a DMD a deflectable beam or mirror may be deflected to one of two landing angles, $\pm\theta_L$, by underlying electrodes to which an address voltage is applied. At either landing angle ($\pm\theta_L$) an extremity of the deflectable mirror lies in contact with an underlying device substrate. Generally, in one orientation, the deflectable mirror is "on", bright, or in other words reflecting light in the field of view. In the other orientation, the mirror is "off", dark, or not reflecting light in the field of view.

It has been discovered in prior art DMDs that a possible manufacturing defect is that of stuck mirrors. In such an instance, individual mirrors may not change between "on" and "off" states in response to changes in address and bias voltages. As such, the mirrors are always "off" or always "on". Always "on" defects or bright defects are particularly noticeable and objectionable. The defective pixels stick for a number of reasons including but not limited to: a defective addressing element underlying the mirror, a poor electrical connection between the mirror and a reference voltage, or a surface defect at the point of mirror contact.

SUMMARY OF THE INVENTION

The present invention is the first to recognize that the defective pixels may have characteristics that allow the effects of their defects to be mitigated. That is, the invention presents a means of changing a pixel tipped in one direction permanently to a pixel that is completely missing, rendered non-reflective, partially reflective, or becomes non-deflected in either direction. In accordance with an embodiment of the present invention, the circuitry used for addressing and biasing mirrors may be employed to effect permanent changes upon the defective pixels without destroying non-defective pixels. Essentially, a high voltage is applied to the mirror contact relative to electrodes which lie on or within the device substrate. The defective mirrors are then drawn forcefully down to substrate through electrostatic attraction. The forces are applied to either break the mirror hinges, or make a direct contact to electrodes on the DMD substrate resulting in high currents which may destroy the hinges or beam.

Although it is possible to provide addressing circuitry to apply these forces to individual mirrors, selectively, this requires knowledge of the location of the defective pixels. Accordingly, another embodiment of this invention applies forces to the entire body of mirrors in such a manner as to effectively destroy only those mirrors which are defective. This is accomplished using the fact that properly functioning pixels can be reset to a fiat state, in which the plane of the pixel beam is parallel to the plane of the device substrate, while the stuck ones cannot. It is known that the mechanical structure of the pixel cannot respond instantaneously to the applied voltage. In fact air resistance has been shown to limit the movement of the pixels. Because the stuck pixels are already tipped they will contact their corresponding electrodes before the functional pixels will. This time lag between contact of stuck pixels to the electrodes and contact of non-defective pixels to their electrodes can be used to destroy the hinges and/or beams of the defective pixels. Hence, an embodiment of the current invention applies short duration, high amplitude electrical pulses to the entire body of pixels whereby the defective pixels will be selectively destroyed.

BRIEF DESCRIPTION OF THE DRAWINGS

For a more complete understanding of the present invention, and the advantages thereof, reference is now made to the following descriptions taken in conjunction with the accompanying drawings, in which:

FIG. 6b illustrates a top view of a preferred embodiment mirror showing major hidden features;

FIG. 6c illustrates a detailed cross sectional view as indicated in FIG. 6b of a preferred embodiment mirror.

Corresponding numerals and symbols in the different figures refer to corresponding parts unless otherwise indicated.

DETAILED DESCRIPTION OF PREFERRED EMBODIMENTS

Figure 1A:
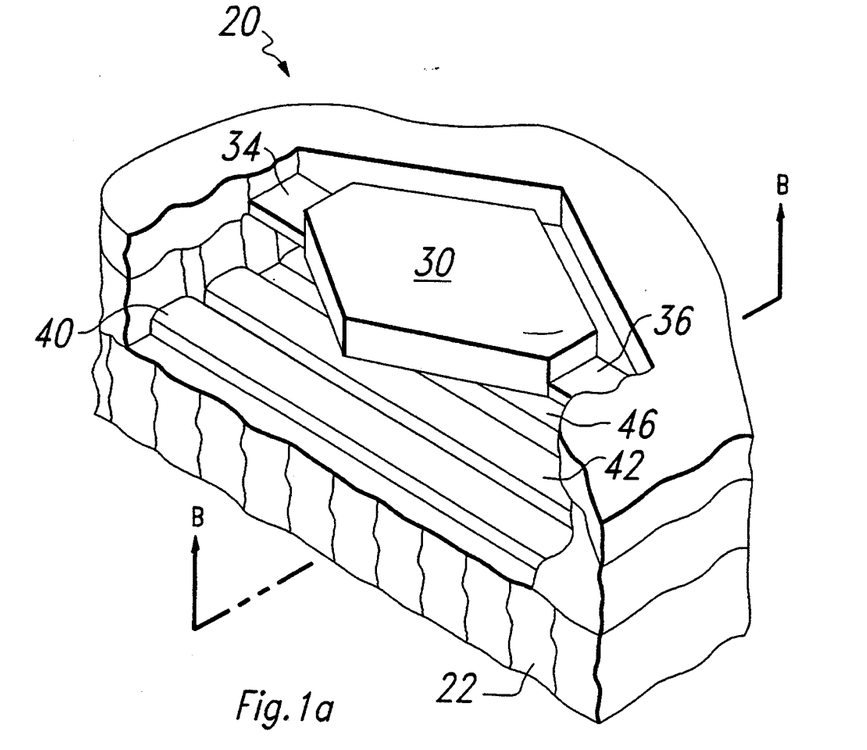
FIGS. 1a–c illustrate in perspective, cross sectional elevation, and plan views, a functional rendering of a preferred embodiment pixel.
Figure 1B:
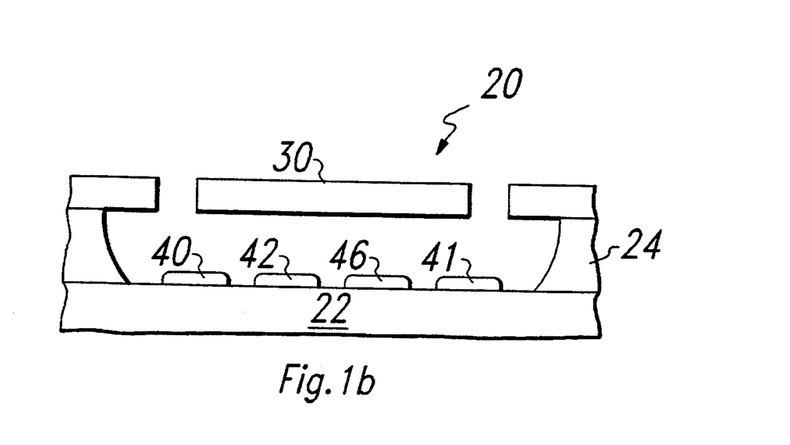
Figure 1C:
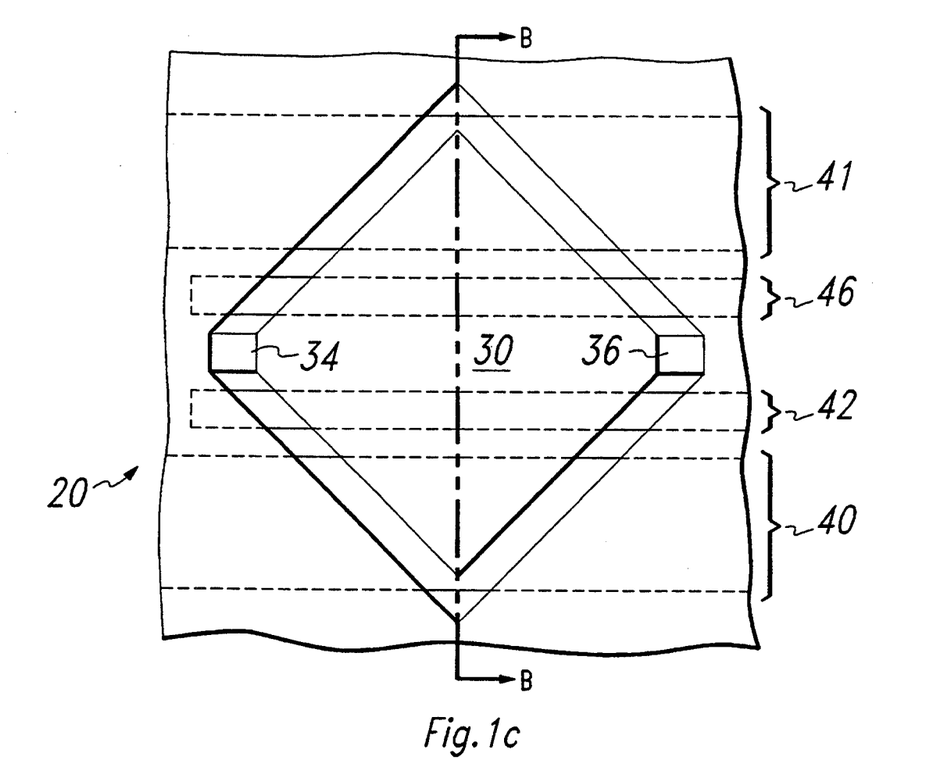

FIGS. 1a–c illustrate in perspective, cross sectional elevation, and plan views a functional rendering of a preferred embodiment mirror. As illustrated by these figures, pixel 20 is operated by applying a voltage between beam 30 and electrodes 42 or 46 on substrate 22. Beam 30 and the electrodes form the two plates of an air gap capacitor and the opposite charges induced on the two plates by the applied voltage exert electrostatic force attracting beam 30 to substrate 22, whereas electrodes 40 and 41 are held at the same voltage as beam 30. The electrostatic force between electrodes 42,46 and beam 30 causes beam 30 to twist at hinges 34 and 36 and be deflected towards substrate 22.

Figure 2:
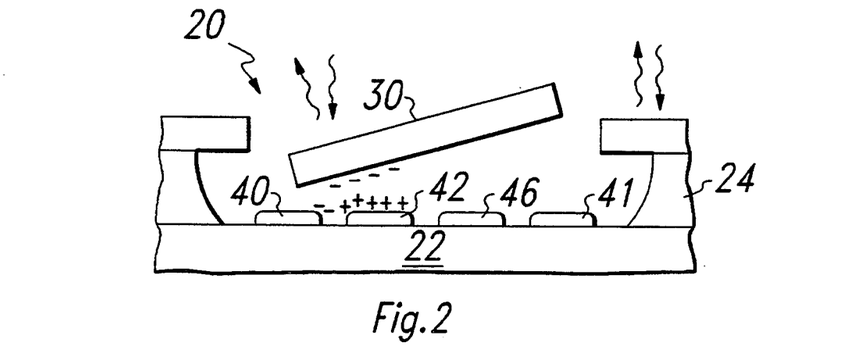
FIG. 2 illustrates deflection of a mirror of the preferred embodiments.

FIG. 2 is a schematic view of the deflection of beam 30 with an indication of the charges concentrated at the regions of smallest gap for a positive voltage applied to electrode 42. For typical CMOS voltages, for instance 5 volts, the deflection is in the range of 2 degrees. Of course, if hinge 34 were made longer or thinner or narrower, the deflection would increase as the compliance of hinge 34 varies linearly with the inverse of its width and directly with the square of its length and inversely with the cube of its thickness. For a DMD operating in its bistable mode, the beam design is such that the beam's 30 deflection is defined by the landing angles, $\pm \theta_L$, at which point the beam 30 contacts the DMD substrate on landing electrodes 40,41. Note that the thickness of beam 30 prevents significant warping of beam 30 due to surface stress generated during processing, but that the thinness of hinge 34 allows for large compliance. FIG. 2 also indicates the reflection of light from deflected beam 30 as may occur during operation of the DMD.

Figure 3:
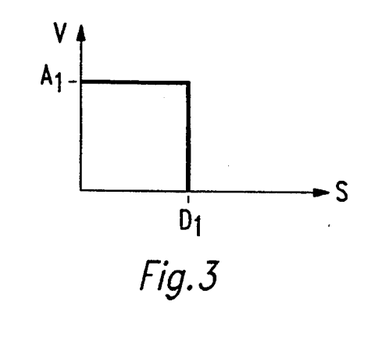
FIG. 3 illustrates defect mitigating voltages which may be applied in a first preferred embodiment in which the voltages are selectively applied to defective pixels.

FIG. 3 illustrates the defect mitigating voltages applied in the first preferred embodiment of the present invention. This embodiment might use addressing circuitry as disclosed in U.S. Pat. No. 5,096,279, incorporated by reference herein, which discloses the addressing and biasing scheme of a typical bistable DMD in great detail. To use this type of addressing and biasing circuitry to mitigate defects requires minor modification obvious to one skilled in the art of circuit design. By using this addressing circuitry, once the defect locations are determined each defective pixel selectively addressed and pulses will be applied to damage the beams and/or hinges for defect mitigation. In particular, the pulses applied for mitigation of defects will of necessity be greater in amplitude, $A_1$ and/or duration, $D_1$, than those used for addressing the micromirrors 30 of the DMD. The amplitude/duration of the first embodiment mitigating voltages must be sufficient to destroy the hinges 34,36 of the pixel 20. The defect mitigating circuitry might serve a dual purpose as the addressing circuitry, or the circuitry may be parallel to the circuitry normally used for addressing the mirrors 30 as in the prior art.

Figure 4:
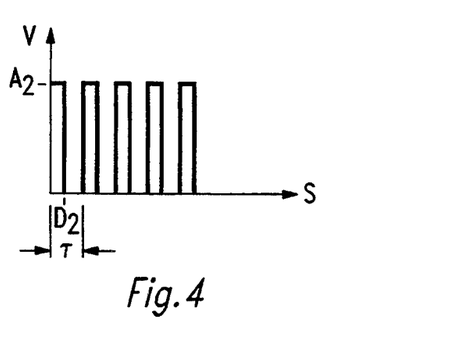
FIG. 4 illustrates defect mitigating voltages which may be applied in a second preferred embodiment in which the voltages are applied to the entire body of pixels.

In a second preferred embodiment, the mitigating pulses as shown in FIG. 4 might be applied to the entire body of pixels simultaneously, or perhaps to subsets of the entire body of pixels. In such instance the pulses would be of short duration and high amplitudes. The amplitude/duration, $A_2/D_2$, should be sufficient to destroy the hinges 34,36 of most defective pixels 20 without damaging an unacceptable number of functional pixels 20 which would be normally undeflected because of the short duration of the pulses. Preferably, the pulses would be periodic with a period $\tau$.

To summarize the addressing circuitry as disclosed in U.S. Pat. No. 5,096,279, incorporated by reference herein, a bistable pixel 20 can be made addressable by establishing a preferred direction for rotation. If both address electrodes 42 and 46 are grounded, then small perturbations will cause beam 30 to randomly rotate and collapse to one of the landing electrodes 40,41 upon application of the differential bias $V_B$ to beam 30 and landing electrodes 40 and 41. However, if prior to application of the differential bias $V_B$, address electrode 46 is set to a potential then a net torque will be produced to rotate beam 30 towards landing electrode 41. Symmetrically, applying the triggering potential to address electrode 42 will rotate beam 30 to landing electrode 40 upon application of the differential bias $V_B$.

In accordance with either embodiment disclosed hereinabove, if the differential bias $V_B$ is applied to beam 30 relative to landing electrodes 40,41, with a great enough amplitude the beam 30 may not only collapse, but the hinges 34,36 will actually be permanently damaged by a large mechanical overstress such that the beam may lie non-deflected upon the underlying substrate in neither an "on" or "off" state. Sufficient deflection may actually cause the beam 30 to contact one of address electrodes 42,46 such that a high current flows through the beam 30 and hinges 34,36. Heating from this high current may be utilized to temperature overstress, melt, or destroy through thermally induced chemical reaction, the hinges 34,36. Sufficient current may even damage by melting, or render non-reflective by a thermally induced chemical reaction, the beam 30 in addition to the damage caused to hinges 34,36. This rendering of the beam 30 to a non-reflective state may be a desirable condition relative to its bright, "on" state. Any thermally induced chemical reaction may take place in a gas as is well known in the art. Any temperature stress by current conduction may be induced within a gas or vacuum. A higher pressure or more viscous gas having a greater damping effect than would air at one atmosphere of pressure may be used to increase the damping on the non-defective beams 30, thereby increasing the time advantage due to the previously mentioned lag between application of a voltage to a non-defective beam 30 and contact of that beam 30 with the DMD substrate (contrasted with the defective beam 30 already being in contact with the DMD substrate). This extra time advantage can be used to more effectively chemically react or stress the defective beam 30.

Many thermally induced chemical reactions can be envisioned which could be employed in this invention. These reactions include but are not limited to electrically-induced thermal oxidation and electrically-induced vapor anodization. For example, the defects resulting from a poor electrical contact between the beam 30 and the bias circuitry are mitigated. In this embodiment, an electrochemical reaction could be performed in a reactive vapor selective to the defective pixels by applying a voltage to all beams 30 and utilizing the fact that only beams 30 with a proper contact will be affected by this electrochemical reaction. This electrochemical reaction could be utilized to mask the non-defective beams 30 from subsequent deposition of a non-reflective or partially reflective surface on the defective beams 30. Alternatively, the non-defective beams 30 may be masked from subsequent chemically reactive vapor processes to etch or otherwise damage the defective beams 30 or the hinges 34, 36.

Figure 5A:
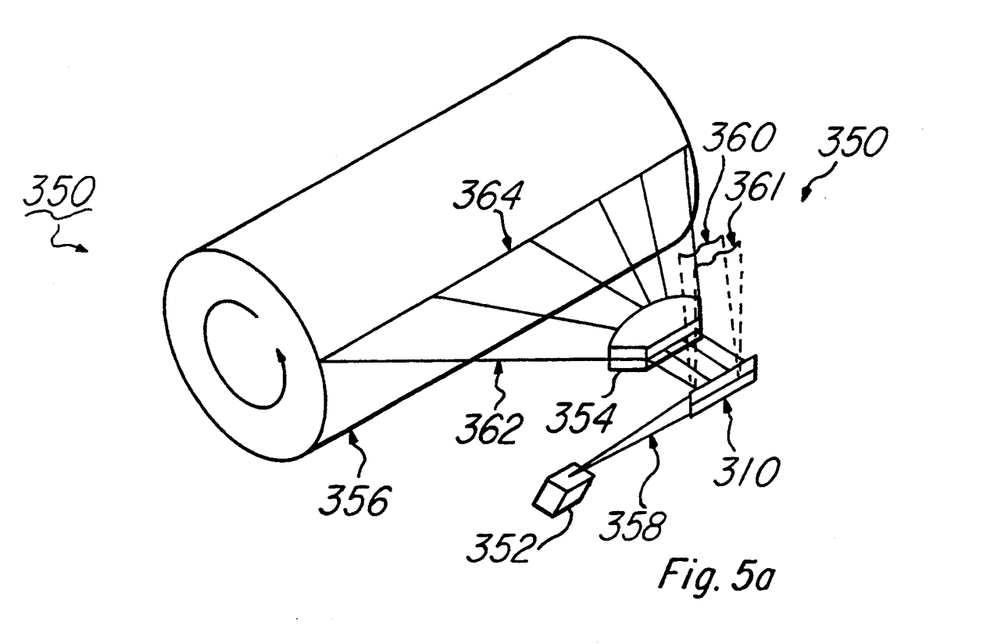
FIGS. 5a–c schematically illustrate use of the preferred embodiment DMD for electrophotographic printing.
Figure 5B:
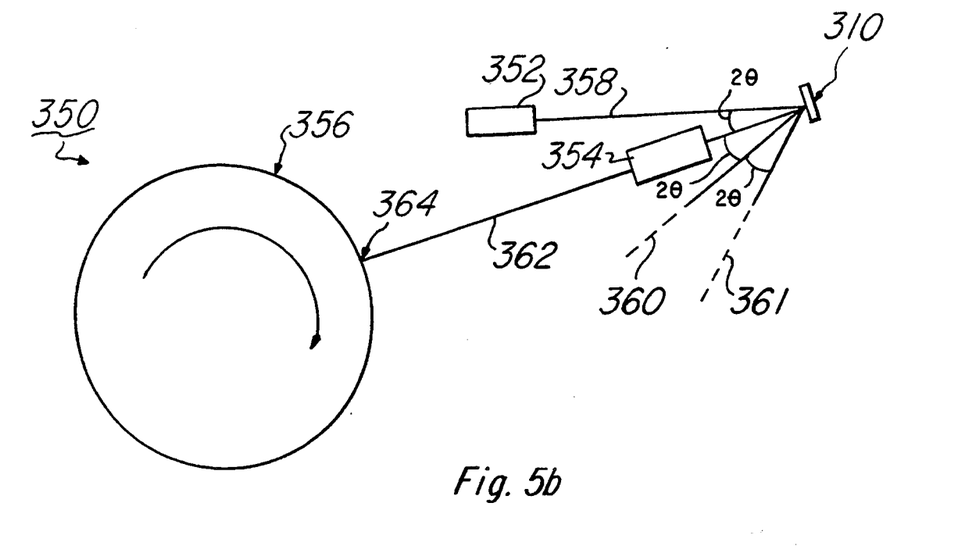
Figure 5C:
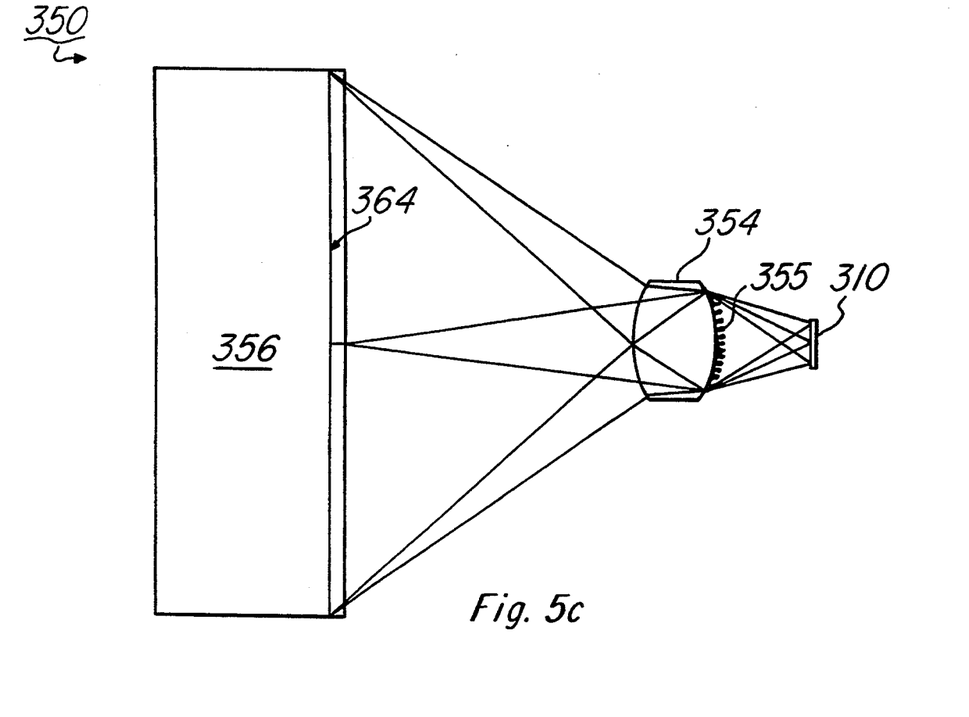

A linear array 310 of preferred embodiment pixels 20 could be used for electrophotographic printing as illustrated schematically in FIGS. 5a–c. FIG. 5a is a perspective view and FIGS. 5b–c are elevation and plan views showing system 350 which includes light source and optics 352, array 310, imaging lens 354 and photoconductive drum 356. The light from source 352 is in the form of a sheet 358 and illuminates linear array 310. Light from the areas between pixels 20 forms sheet 360 which is the specularly reflected sheet of light. The light reflected from negatively deflected beams form sheet 361. The light reflected from positively deflected beams 30 pass through imaging lens 354 within sheet 362 and focus on drum 356 within line 364 as a series of dots, one for each deflected beam 30. Thus a page of text or a frame of graphics information which has been digitized and is in raster-scanned format can be printed by feeding the information a line at a time to array 310 to form dots a line 364 at a time on drum 356 as drum 356 rotates. These dot images are transferred to paper by standard techniques such as xerography. If 0 is the deflection angle of beam 30 when on landing electrodes 41, then sheet 362 is normal to linear array 310 when the angle of incidence of sheet 358 is 20° from the normal to linear array 310. This geometry is illustrated in FIG. 5b and permits imaging lens 354 to be oriented normal to linear array 310. Each positively deflected beam produces an image 355 of light source 352 on imaging lens 354 as schematically shown in FIG. 5c for three beams.

Figure 6A:
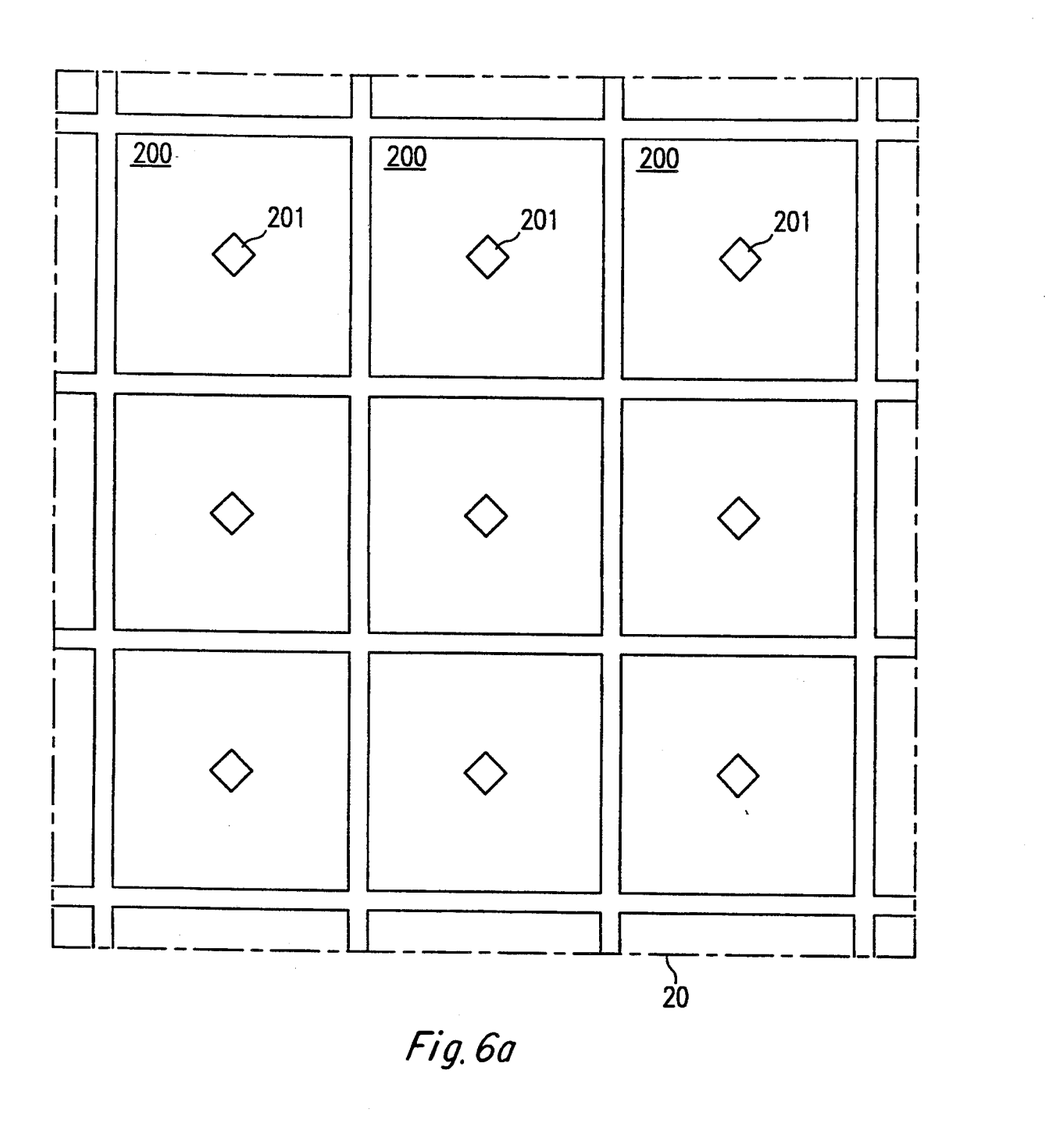
FIG. 6a illustrates a top view of a partial array of preferred embodiment mirrors.

FIGS. 6a–c illustrate a top view, a top view showing major hidden features, and a detailed cross section of a partial array of preferred embodiment mirrors. This preferred embodiment structure uses a multi-level deformable mirror structure and method of manufacturing as disclosed by Hornbeck in U.S. Pat. No. 5,083,857. As shown in FIG. 6a, this structure provides a greatly improved area of rotatable reflective surface for a given pixel size. The underlying hinges, address and landing electrodes are shown as dotted lines in FIG. 6b. Beam support post 201 rigidly connects beam 200 to underlying torsion hinge 401. Details of the underlying hinge and electrodes are shown in FIG. 6b. Beam support post 201 allows beam 200 to rotate under control of hinges 401 which in turn are connected to posts 406. This allows rotatable surface (beam) 200 to rotate under control of an electrode supported by posts 403. Beam 200 lands in contact with landing electrode 405. Contact 402 extends through the substrate and is in contact with the underlying address electronics. The construction and operation of this device will be discussed hereinafter. FIG. 6c illustrates beam 200 rotation 200a to landing angle $-\theta_L$ and rotation 200b to landing angle $+\theta_L$. Also shown are address electrodes 404 which control the movement (200a, 200b) and landing electrodes 405 positioned at the other end of the see-saw swing of beam 200. The manner of controlling the rotational movement of beam 200 is detailed in U.S. Pat. No. 5,096,279 filed on Nov. 26, 1990.

Figure 7A:
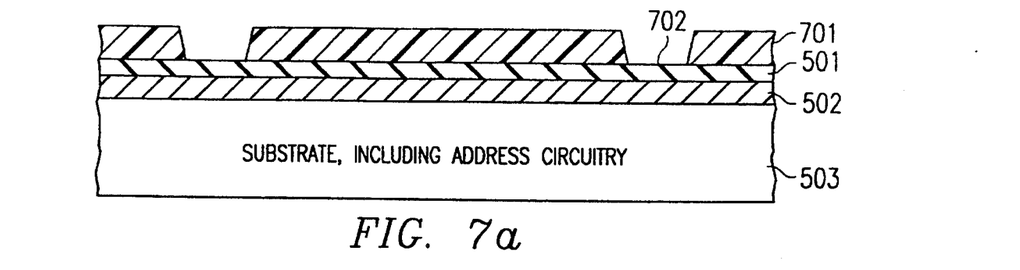
FIGS. 7a–d illustrate, in partial cross section, progressive formation of a mirror of the preferred embodiment.

The process sequence for the hidden hinge architecture is shown in FIGS. 7a–7d and consists of five layers (hinge spacer, hinge, electrode, beam spacer, and beam). Referring now specifically to FIG. 7a, the process begins with a completed address circuit 503 including contact openings formed in protective oxide 501 of the address circuit. The address circuit is typically a two metal layer/poly CMOS process. The contact openings allow access to the second level metal (METL2) 502 bond pads and to the METL2 address circuit output nodes.

Still referring to FIG. 7a, hinge spacer 701 is spin-deposited over the address circuit and patterned with holes 702 that will form the hinge support posts and electrode support posts and contacts. This spacer is typically 0.5 μm thick and is a positive photoresistant deep UV hardened to a temperature of 200° C. to prevent flow and bubbling during subsequent processing steps.

Figure 7B:
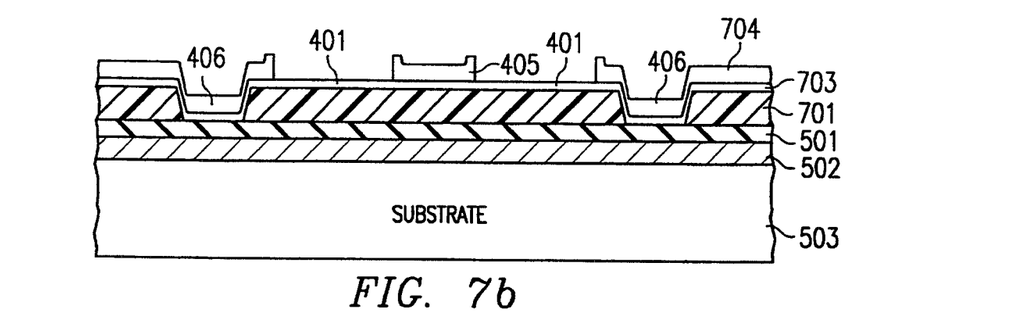

As shown in FIG. 7b, the next two layers 703 and 704 are formed by the so-called buried hinge process. An aluminum alloy that forms the hinge is sputter-deposited onto the hinge spacer. This alloy is typically 750 Å thick and consists of 0.2% Ti, 1% Si and the remainder Al. A masking oxide is plasma-deposited and patterned in the shape of hinges 401. This hinge oxide is then buried by a second aluminum alloy layer 704 that is to form the electrode (typically 3000 Å thick).

With further reference to FIG. 7b, a masking oxide is plasma-deposited and patterned in the shape of the electrodes 404, the electrode support posts 406 and the beam contact metal 405. Next, a single plasma aluminum etch is used to pattern the hinges, electrodes, support posts and beam contact metal. The electrode metal overlying the hinge region is etched away, exposing the buried-hinge oxide which acts as an etch stop. When the plasma aluminum etch is complete, regions of thin hinge metal 703 and thick electrode metal 704 have been simultaneously patterned. The masking oxide is then removed by a plasma etch.

Figure 7C:
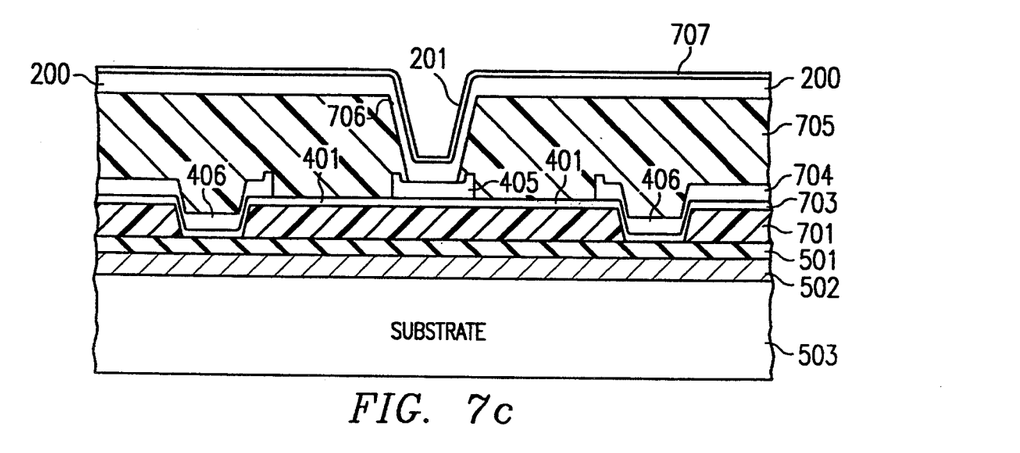
Figure 7D:
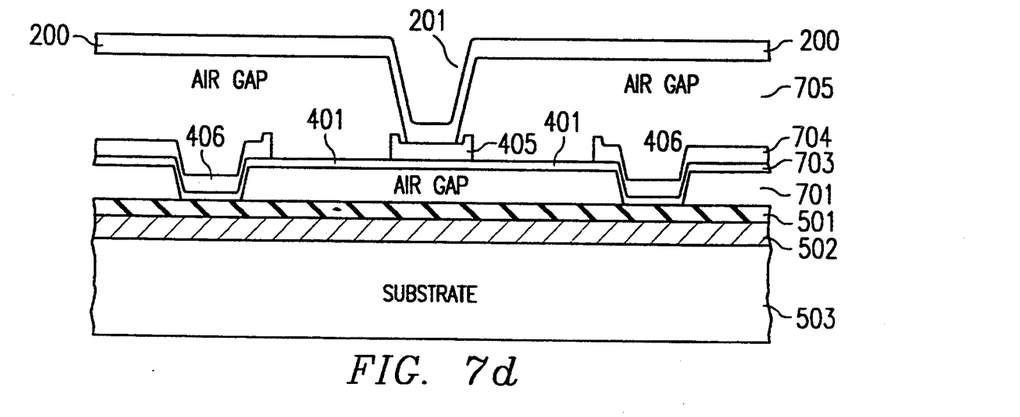

Next as shown in FIG. 7c, beam spacer 705 is spin-deposited over the hinges and electrodes and patterned with holes that will form beam support posts 201. Spacer 705 determines the torsion beam angular deflection and is typically 1.5 microns thick and is a positive photoresistant. It is deep UV hardened to a temperature of 180° C. to prevent flow and bubbling during subsequent processing steps. Note that no degradation of hinge spacer 701 occurs during this bake, because the hinge spacer was hardened to a higher temperature (200° C.). Next, an aluminum alloy that is to form beam 200 (typically 4000 Angstroms thick) is sputter-deposited onto beam spacer 705. Next, masking oxide 707 is plasma-deposited and patterned in the shape of the beams. The beam is then plasma etched to form the beams and beam support posts. This completes the process at the wafer level. Masking oxide 707 on beam 200 is left in place. The wafers are then coated with PMMA, sawed into chip arrays and pulse spin-cleaned with chlorobenzene. Finally, the chips are placed in a plasma etching chamber, where masking oxide 707 is removed and both spacer layers 701 and 705 are completely removed to form the air gaps under the hinges and beams as shown in FIG. 7d.

Although this description describes the invention with reference to the above specified embodiments, the claims and not this description limited the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

A few preferred embodiments have been described in detail hereinabove. It is to be understood that the scope of the invention also comprehends embodiments different from those described, yet within the scope of the claims. Words of inclusion are to be interpreted as non-exhaustive in considering the scope of the invention. Implementation is contemplated in discrete components or fully integrated circuits in silicon, gallium arsenide, or other electronic materials families, as well as in optical-based or other technology-based forms and embodiments.

While the preferred embodiment has been described in terms of damaging a bright, defective pixel, the difference between a permanently bright pixel and a permanently dark pixel is merely one of orientation. It is thus inherent in this invention that the characteristics of dark pixels may also be affected by the methods described herein. Although the described embodiment of this invention is the damaging of defective pixels, the invention also comprehends restoring defective pixels to their proper function.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of mitigating the effects of a defective pixel having electrodes, the method comprising the step of applying a voltage across said electrodes sufficient to permanently change electromechanical characteristics of said pixel.

2. The method of claim 1 wherein said defective pixel permanently transmits light into an observer's field of view prior to said step of applying said voltage.

3. The method of claim 1 wherein said pixel is an electromechanical pixel having a hinge.

4. The method of claim 2 wherein said pixel is damaged such that it no longer permanently transmits said light into the observer's field of view.

5. The method of claim 4 wherein said damage is by mechanical overstress.

6. The method of claim 4 wherein said damage is by thermal overstress.

7. The method of claim 6 wherein said thermal overstress is caused by an electrical current flowing through said defective pixel by its contact with a substrate upon which said defective pixel is mounted.

8. The method of claim 3 wherein said hinge is damaged by said applied voltage.

9. The method of claim 1 wherein said voltage is a set of periodic pulses.

10. The method of claim 1 wherein said defective pixel is part of an array of electromechanical pixels and wherein said voltage is applied to a plurality of said electromechanical pixels, said voltage being sufficient to change the characteristics of said defective pixel.

11. A method of mitigating the effects of a defective, bright electromechanical pixel that is part of an array of electromechanical pixels having hinges wherein said defective, bright pixel transmits light into an observer's field of view, the method comprising the step of applying a set of periodic voltage pulses to a plurality of pixels of said array of electromechanical pixels, at least one of said plurality of pixels not being defective, the set of periodic voltage pulses having a sufficient amplitude and duration to change the characteristics of said defective electromechanical pixel whereby said defective electromechanical pixel no longer transmits said light into said field of view.

12. The method of claim 11 wherein said pixel is further damaged such that it no longer permanently transmits said light into said field of view.

13. The method of claim 12 wherein said hinge is damaged.

14. The method of claim 12 wherein said damage is by mechanical overstress.

15. The method of claim 12 wherein said damage is by thermal overstress.

* * * * *